Figure 2:
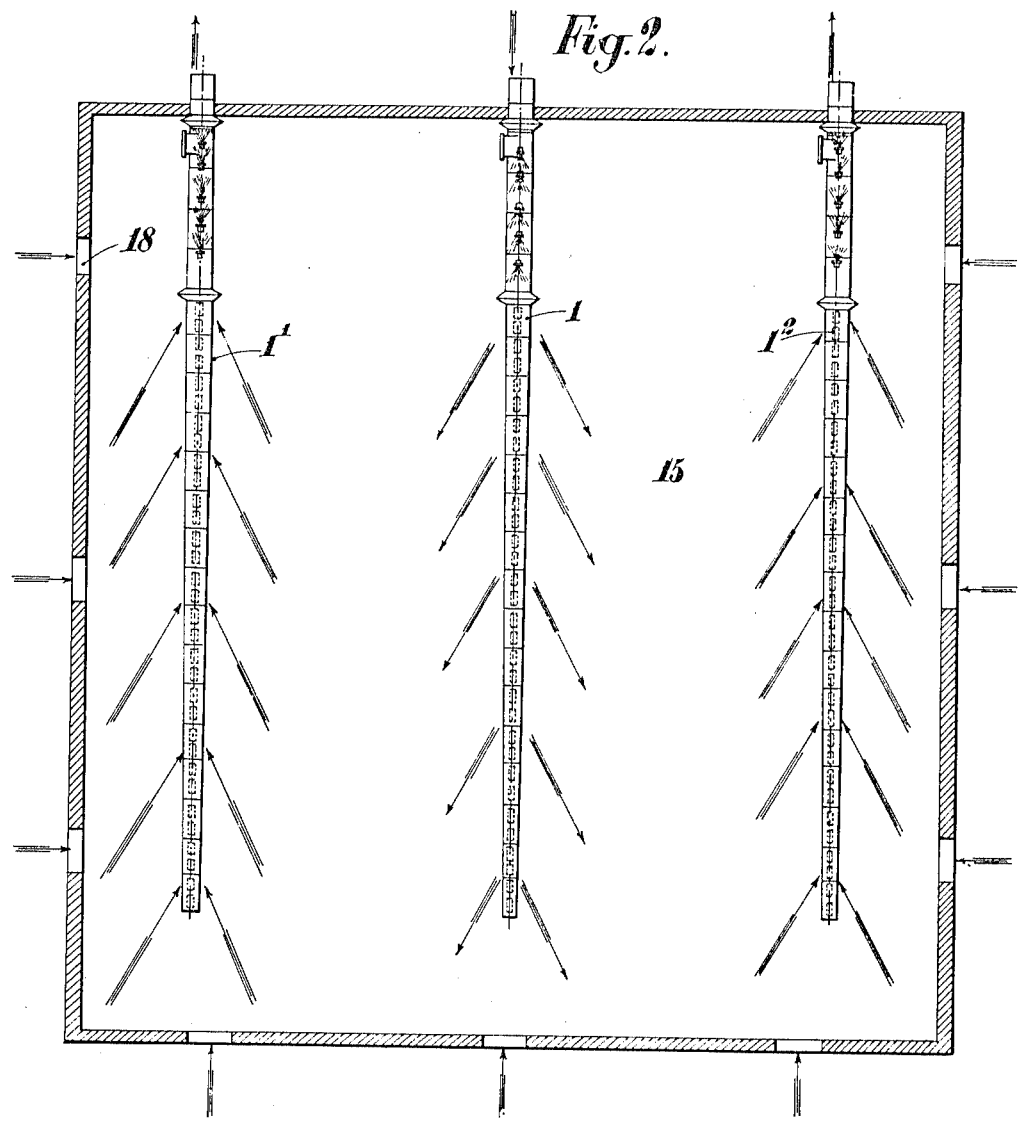

J. F. P. KESTNER & H. J. E. NEU.
ARRANGEMENT FOR VENTILATING AND FOR MOISTENING THE ATMOSPHERE OF PREMISES.
APPLICATION FILED SEPT. 30, 1912.
1,073,609.
Patented Sept. 23, 1913.
3 SHEETS—SHEET 1.
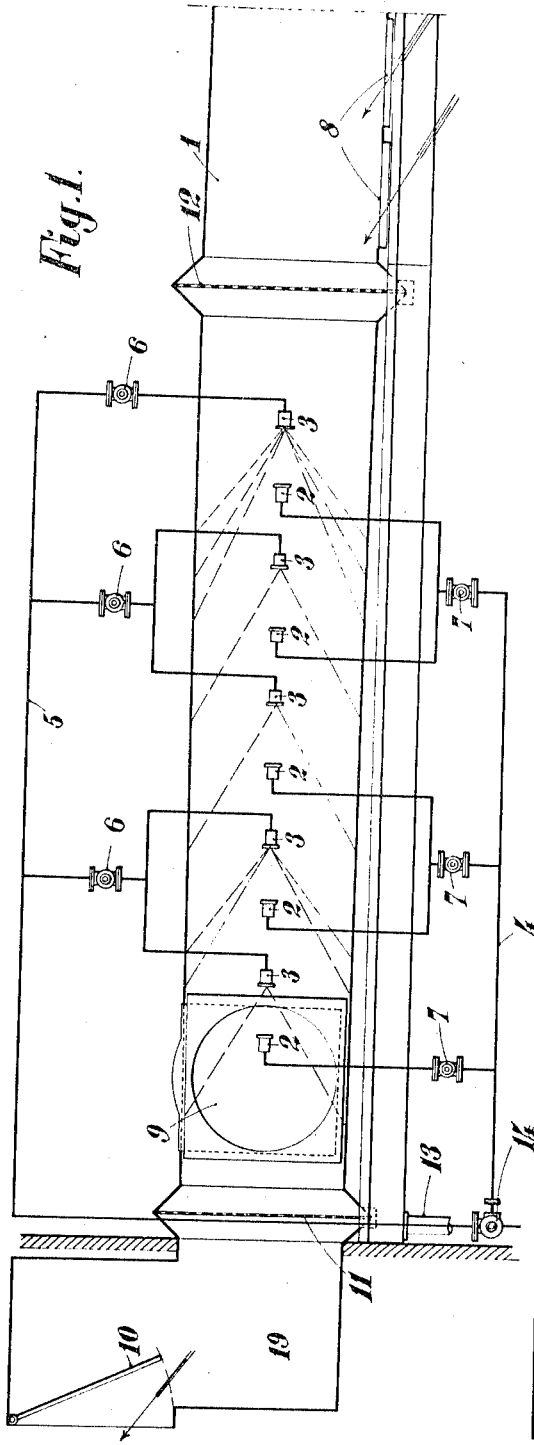
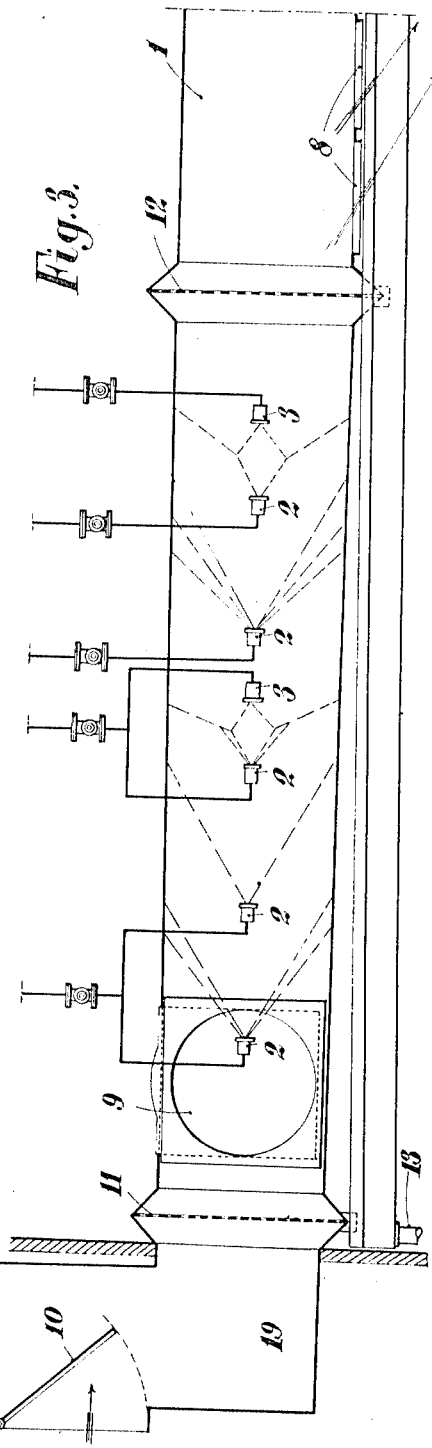

J. F. P. KESTNER & H. J. E. NEU.
ARRANGEMENT FOR VENTILATING AND FOR MOISTENING THE ATMOSPHERE OF PREMISES.
APPLICATION FILED SEPT. 30, 1912.

1,073,609.

Patented Sept. 23, 1913.

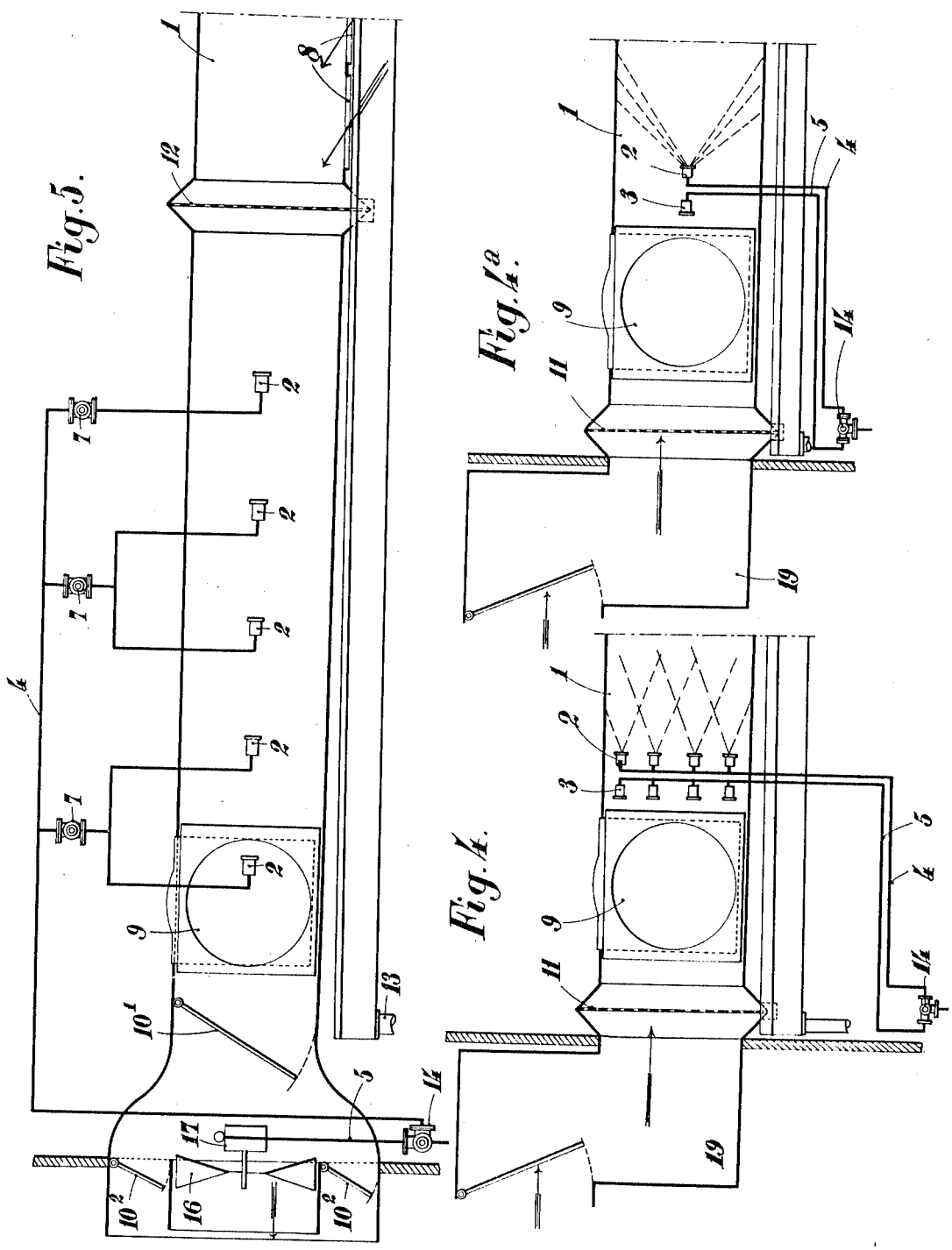

UNITED STATES PATENT OFFICE.

JEAN FREDERIC PAUL KESTNER AND HENRI JEAN EMILE NEU, OF LILLE, FRANCE.

ARRANGEMENT FOR VENTILATING AND FOR MOISTENING THE ATMOSPHERE OF PREMISES.

1,073,609.   Specification of Letters Patent.   Patented Sept. 23, 1913.

Application filed September 30, 1912. Serial No. 723,204.

*To all whom it may concern:*

Be it known that we, JEAN FREDERIC PAUL KESTNER and HENRI JEAN EMILE NEU, citizens of the French Republic, residing at Lille, Department of the Nord, in France, have invented certain new and useful Improvements in Arrangements for Ventilating and for Moistening the Atmosphere of Premises; and we do hereby declare the following to be a full, clear, and exact description of the invention, such as will enable others skilled in the art to which it appertains to make and use the same.

The invention relates to an improved arrangement for ventilating and moistening the atmosphere of premises, and is more particularly applicable to those premises in which the treatment of textile materials is carried out.

The object of this improved arrangement is to enable either ventilation without moistening, or moistening without ventilation, or both ventilation and moistening simultaneously, to be carried out, at will, by means of one and the same supply of water under pressure. For this purpose according to this invention a group of pipes provided with nozzles are placed in a large tube communicating with the space or chamber to be ventilated. By means of suitable valves water under pressure is supplied to these pipes, the nozzles of which emit a series of jets of sprayed water in the same direction thus forcing moist air along the tube at one end and drawing in air by suction at the opposite end. For drawing air into the tube in the opposite direction, either a second group of pipes may be provided having nozzles arranged oppositely to those of the first mentioned group of pipes, or a ventilator may be employed operated by a hydraulic turbine utilizing the same supply of water under pressure. Suitable valves or dampers are also provided for controlling and varying the connection of the tube with the chamber to be ventilated and with the outer air, thus enabling the desired effect to be obtained in the said chamber. Thus, by the simple manipulation of valves, both ventilation and moistening to the extent desired can be instantaneously obtained according to requirements.

In order that the invention may be properly understood an embodiment of the same, together with various modifications in detail, will now be described with reference to the accompanying drawings, in which:

Figure 1 shows an arrangement of two groups of pipes provided with nozzles within a tube communicating with the chamber to be ventilated, the water supply to one of the groups being supposed to be cut off; Fig. 2 is a plan view of the interior of a chamber provided with a ventilating and moistening arrangement in accordance with the invention; Fig. 3 shows an arrangement somewhat similar to that shown in Fig. 1, comprising two groups of nozzle pipes having a different number of pipes in each group; Fig. 4 illustrates a modification in which the nozzle pipes of the same group are mounted near to one another in the same vertical plane; Fig. 4ª illustrates another modification comprising only two multiple nozzles directed oppositely to one another; while Fig. 5 shows an arrangement in which a current of air is produced in one direction by a group of nozzle pipes, and another air current in the opposite direction is produced by a ventilator fan or the like actuated by hydraulic means.

Referring first to Fig. 1 of the drawings, the apparatus shown consists of a tube 1 into which are passed several nozzle pipes 2 arranged one behind the other along the tube and with their nozzles pointing in the same direction. These nozzle pipes 2 are supplied with water from the same water pipe 4, the supply being controlled by means of valves 7, and from the nozzles issue finely sprayed jets of water having a conical form. These nozzle pipes may be of different construction; some of them, for instance, may be provided with nozzles arranged to give several concentric jets. In the tube 1 another series of nozzle pipes 3 is arranged supplied from a water pipe 5, the jets from the pipes 3 being controlled by means of valves 6. Water is supplied to the supply pipes 4 and 5 by a common conduit containing a three-way valve 14 which permits of admitting water either into the pipe 5 or 4, or simultaneously into both of those pipes. The tube 1 is further provided with a valve or damper 9, by which it communicates with the chamber to be ventilated, and a valve or damper 10 for communicating with the outside air. In order to stop large drops of water and water condensed upon the walls of the tube 1, movable wire gauze curtains 11 and 12 are placed in the tube and at the outer end of the tube a neck 19 is arranged having a double bend. Any other water-separating arrangement can also be adopted, such as strips arranged as shutters or baffles. The drainage of water condensed in the tube is effected by means of a trap 13.

The apparatus described above for producing the spraying of the water and the suction of air only occupies a part of the tube 1; the other part, which may have any desired length, is in permanent communication with the chamber to be ventilated by means of a series of orifices 8; if desired it may be provided with only one large orifice at its end.

When it is desired to ventilate without moistening, the supply of water to the nozzle pipes 2 is shut off and all or some of the valves 6 supplying the nozzle pipes 3 are opened when a series of jets of water are produced directed as indicated in Fig. 1. The valve or damper 10 being opened and the valve 9 closed, these water jets by their ejector action cause a flow of air in the tube 1 in the direction shown by the arrows. Thus a ventilation by suction is produced in the chamber; the sprayed water which issues from the pipes 3 is recovered by the gauze separator 11, the other separator 12 having been opened to allow the air to be more easily drawn into the chamber, while the water which is evaporated is exhausted to the exterior.

When it is desired to ventilate and moisten simultaneously, the supply of water to the nozzle pipes 3 is shut off by means of the valves 6 and 14 and water is supplied to the nozzle pipes 2 by means of the valves 14 and 7, whence a series of jets of water are produced directed toward the orifices 8. The valve 9 being still closed and the valve 10 open a very energetic suction is thus produced which causes outer air to penetrate into the tube where it becomes charged with moisture and then passes through the orifices 8 into the chamber to be ventilated.

Referring to Fig. 2, a chamber 15 is shown provided with an installation in accordance with this invention comprising three tubes 1, $1^1$, $1^2$. The middle tube 1 draws in outside air and supplies it moistened into the chamber 15. The other tubes $1^1$ and $1^2$, on the contrary, draw the air out of the chamber 15 and expel it to the exterior. Orifices 18 may also be provided in the walls of the chamber to facilitate the entrance and circulation of air.

Referring to Fig. 3, an arrangement is shown in which the two groups of nozzle pipes 2 and 3 can be supplied with water simultaneously, one of them, for instance, group 2, being considerably more powerful than the other. Opposite some of the nozzles of group 2 nozzles of group 3 are arranged so that their jets meet those emitted by the nozzles of group 2. When both of these groups of nozzle pipes are supplied with water simultaneously an extremely fine spray is produced due to the collision of the two sheets of water. As the action of the nozzle pipes 2 preponderates, the result is that moistened air is forced in the direction of the arrows; the air is circulated either in the chamber itself or to the outside, according as the valve 9 or the valve 10 is open.

In the modification shown in Fig. 4, the nozzle pipes of the same group, instead of being arranged successively one after the other, are placed side by side in the same vertical plane. By means of valve 14 water can be supplied at will either to group 2 or group 3 of nozzle pipes, so as to produce a current of air in either direction as may be desired. The arrangement of Fig. 1 and that of Fig. 4 can be combined, where circumstances render this desirable, by arranging the groups of nozzle pipes 2 and 3 in several vertical planes. On the other hand when desired, only two nozzle pipes may be employed, each having several concentric nozzles, the nozzles of one pipe being directed oppositely to those of the other as shown in Fig. $4^a$.

In Fig. 5 another arrangement is illustrated for causing a current of air in a direction contrary to the air current produced by means of a group of nozzle pipes. In this arrangement a ventilator fan may be employed operated from the same supply of water under pressure as that which supplies the said nozzles. This ventilator fan takes the place of a second group of nozzle pipes. The tube 1 contains one group of nozzle pipes 2, the jets of which are directed toward the orifices 8. At the opposite end of the tube is placed a ventilator fan 16 driven by a turbine 17 which is operated by the water from a supply pipe 5. The supply of water to pipe 4, which is connected to the nozzle pipes 2, and the supply to pipe 5, is controlled by means of a three-way valve 14 as in the case illustrated in Fig. 1. The valves or dampers $10^1$ and $10^2$ arranged as shown permit of regulating the supply of the outside air, a valve 9 being provided as before to establish communication between the tube 1 and the chamber to be ventilated. If it is desired to moisten without ventilating, the turbine 17 is left at rest and the nozzle pipes 2 are brought into action after having opened the valve 9 and closed the valve $10^1$. In order to ventilate and moisten simultaneously the valve $10^1$ is opened and the valve 9 is closed. If, on the other hand, it is desired to produce ventilation without moistening, the supply of water to the nozzle pipes 2 is cut off and water is admitted to the turbine 17; this drives the ventilator fan 16 and the suction of the latter causes a flow of air in the direction of the arrows. By providing a ventilator fan having a reversible action, it will be possible to ventilate by either one of two methods as may be desired, namely, either by exhausting to the exterior the air from the interior, or, on the contrary, by introducing outside air under pressure into the chamber to be ventilated.

The arrangement above described is easily carried out in practice and only requires a very small expenditure of power. Further, the arrangement is such that by the simple manipulation of valves, the operations of moistening and ventilating can be combined at will in any desired proportions.

We claim:

1. Ventilating and humidifying apparatus comprising a casing in communication at opposite ends thereof with the atmosphere and interior space to be ventilated and in communication with said interior space at an intermediate point, a plurality of nozzles arranged within the casing adapted to inject fluid jets in the casing and thereby cause a circulation of air therethrough, means to cause a circulation of air in the casing in the opposite direction from that caused by said nozzles, means to cut off communication between the casing and the atmosphere, and means to cut off communication between the casing and the interior space at said intermediate point whereby said interior space may be ventilated and simultaneously moistened, ventilated but not moistened, or moistened but not ventilated.

2. Ventilating and humidifying apparatus comprising a casing in communication at opposite ends thereof with the atmosphere and interior space to be ventilated and in communication with said interior space at an intermediate point, a plurality of nozzles arranged within the casing adapted to inject fluid jets in the casing and thereby cause a circulation of air therethrough, a plurality of nozzles adapted to inject fluid jets in the opposite direction from said first-named nozzles to cause a circulation of air through the casing, means to cut off communication between the casing and the atmosphere, and means to cut off communication between the casing and the interior space at said intermediate point whereby said interior space may be ventilated and simultaneously moistened, ventilated but not moistened, or moistened but not ventilated.

In testimony whereof we affix our signatures, in presence of two witnesses.

JEAN FREDERIC PAUL KESTNER.
HENRI JEAN EMILE NEU.

Witnesses:
 CHARLES JOSEPH NESTOR HUYRAN,
 ETIENNE ADOLPHE ALPHONSE HUGLO.